United States Patent
Heitkamp et al.

(10) Patent No.: US 10,419,866 B2
(45) Date of Patent: Sep. 17, 2019

(54) SHARED THREE-DIMENSIONAL AUDIO BED

(71) Applicant: Microsoft Technology Licensing, LLC, Redmond, WA (US)

(72) Inventors: Robert Norman Heitkamp, Sammamish, WA (US); Philip Andrew Edry, Seattle, WA (US); Ziyad Ibrahim, Redmond, WA (US); Paul J. Radek, Bellevue, WA (US); Steven Wilssens, Kenmore, WA (US); Brian C. McDowell, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 3 days.

(21) Appl. No.: 15/621,941

(22) Filed: Jun. 13, 2017

(65) Prior Publication Data

US 2018/0103334 A1    Apr. 12, 2018

Related U.S. Application Data

(60) Provisional application No. 62/405,665, filed on Oct. 7, 2016.

(51) Int. Cl.
*H04R 5/00*    (2006.01)
*H04R 5/02*    (2006.01)
(Continued)

(52) U.S. Cl.
CPC ............ *H04S 7/303* (2013.01); *G10L 19/008* (2013.01); *H04R 5/02* (2013.01); *H04R 5/04* (2013.01);
(Continued)

(58) Field of Classification Search
CPC ....... H04S 7/303; H04S 3/008; G10L 19/008; H04R 5/02; H04R 5/04; G06F 3/162
(Continued)

(56) References Cited

U.S. PATENT DOCUMENTS 8,280,083 B2   10/2012 Pallone et al.
8,768,494 B1    7/2014 Stroud et al.
(Continued)

FOREIGN PATENT DOCUMENTS

EP         2883366 A1    6/2015
WO      2014025752 A1    2/2014
(Continued)

OTHER PUBLICATIONS

"International Search Report and Written Opinion Issued in PCT Application No. PCT/US2017/054808", dated Dec. 15, 2017, 12 Pages.
(Continued)

*Primary Examiner* — Xu Mei
*Assistant Examiner* — Ammar Hamid
(74) *Attorney, Agent, or Firm* — Newport IP, LLC; Scott Y. Shigeta

(57) ABSTRACT

A system for enabling a shared three-dimensional ("3D") audio bed available to multiple software applications is provided. The system manages bed metadata defining a number of speaker objects of a 3D audio bed. The bed metadata also associates each speaker object with a location, which in some configurations, is defined by a three-dimensional coordinate system. The bed metadata is communicated to a plurality of applications. The applications can then generate custom 3D audio data that associates individual audio streams with individual speaker objects of the 3D audio bed. The applications can then communicate the custom 3D audio data to a 3D audio bed engine, which
(Continued)

causes the processing and rendering of the custom 3D audio data to an output device utilizing a selected spatialization technology. Aspects of the 3D bed can be altered when the spatialization technology or the output device changes.

20 Claims, 10 Drawing Sheets

(51) Int. Cl.
*H04S 7/00* (2006.01)
*H04R 5/04* (2006.01)
*H04S 3/00* (2006.01)
*G10L 19/008* (2013.01)
*G06F 3/16* (2006.01)

(52) U.S. Cl.
CPC .............. *H04S 3/008* (2013.01); *G06F 3/162* (2013.01); *H04S 7/308* (2013.01); *H04S 2400/01* (2013.01); *H04S 2400/11* (2013.01)

(58) Field of Classification Search
USPC .................. 381/23, 22, 310, 300; 700/94
See application file for complete search history.

(56) References Cited

U.S. PATENT DOCUMENTS

| | | | |
|---|---|---|---|
| 9,107,021 B2 | 8/2015 | Florencio et al. | |
| 9,179,236 B2 | 11/2015 | Robinson et al. | |
| 9,204,236 B2 | 12/2015 | Tsingos et al. | |
| 9,301,069 B2 | 3/2016 | Seligmann et al. | |
| 2005/0222844 A1 | 10/2005 | Kawahara et al. | |
| 2006/0247918 A1 | 11/2006 | Schmidt et al. | |
| 2010/0142724 A1 | 6/2010 | Mcmanus et al. | |
| 2012/0105603 A1 | 5/2012 | Liu et al. | |
| 2012/0263307 A1 | 10/2012 | Armstrong et al. | |
| 2015/0055770 A1 | 2/2015 | Spittle et al. | |
| 2015/0146873 A1* | 5/2015 | Chabanne ............... H04S 3/008 381/1 |
| 2016/0064003 A1* | 3/2016 | Mehta ................... G10L 19/008 381/23 |
| 2016/0073197 A1 | 3/2016 | Hammer et al. | |
| 2016/0192105 A1* | 6/2016 | Breebaart ............... G10L 19/00 381/303 |

FOREIGN PATENT DOCUMENTS

| | | |
|---|---|---|
| WO | 2015017235 A1 | 2/2015 |
| WO | 2015104237 A1 | 7/2015 |

OTHER PUBLICATIONS

Kade, et al., "3D Sound Application for Game Environments", In Thesis of Malardalen University, Oct. 14, 2014, 38 pages.

"3D Audio Technologies", http://web.archive.org/web/20070823202044/http://www.qsound.com/technology/3d-audio.htm, Published on: Apr. 23, 2007, 2 pages.

Song, et al., "An Interactive 3D Audio System with Loudspeakers", In Journal of IEEE Transactions on Multimedia, vol. 13, Issue 5, Oct., 2011, pp. 1-11.

Naef, et al., "Spatialized Audio Rendering for Immersive Virtual Environments", In Proceedings of the ACM symposium on Virtual reality software and technology, Nov. 11, 2002, 9 pages.

* cited by examiner

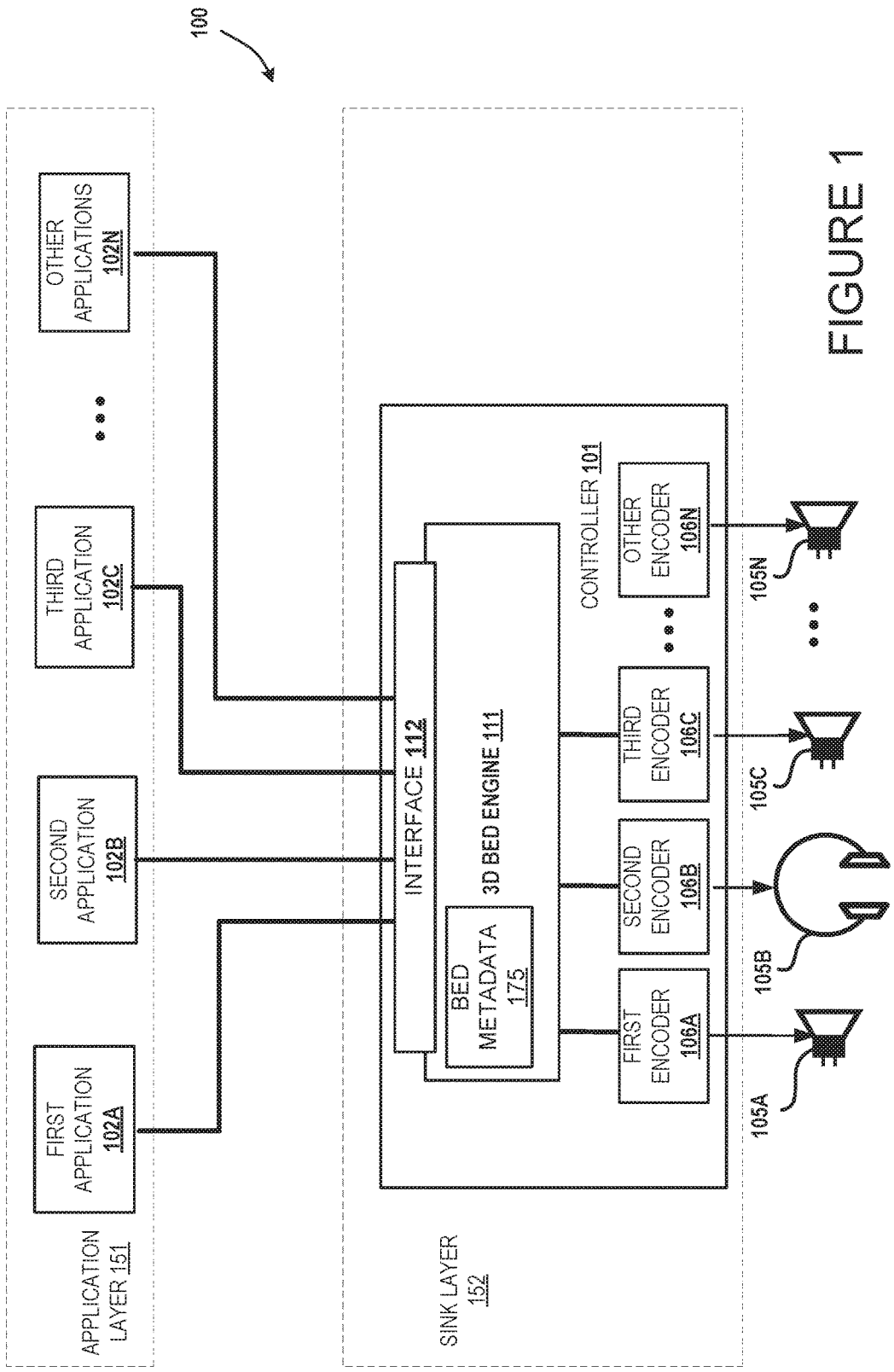

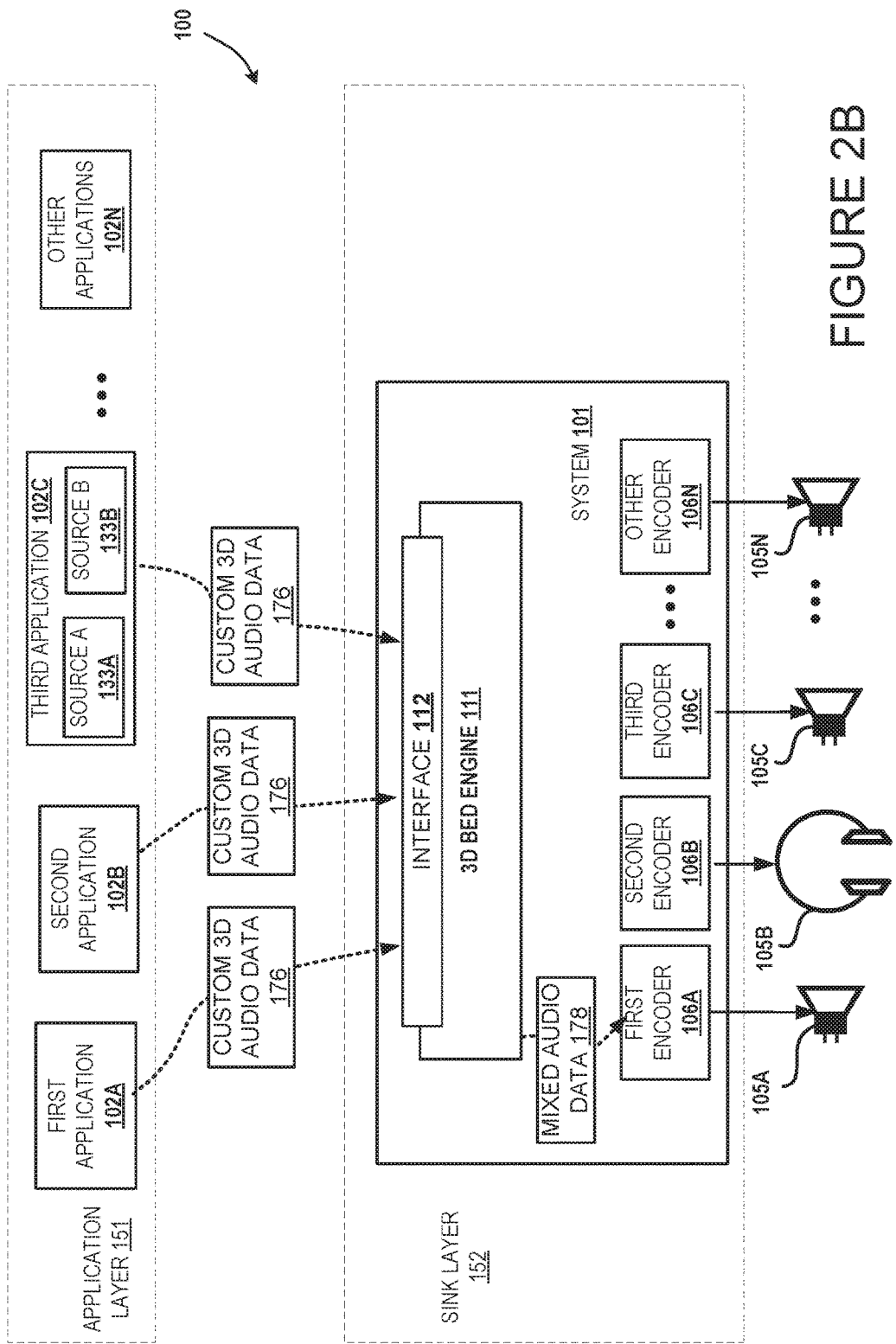

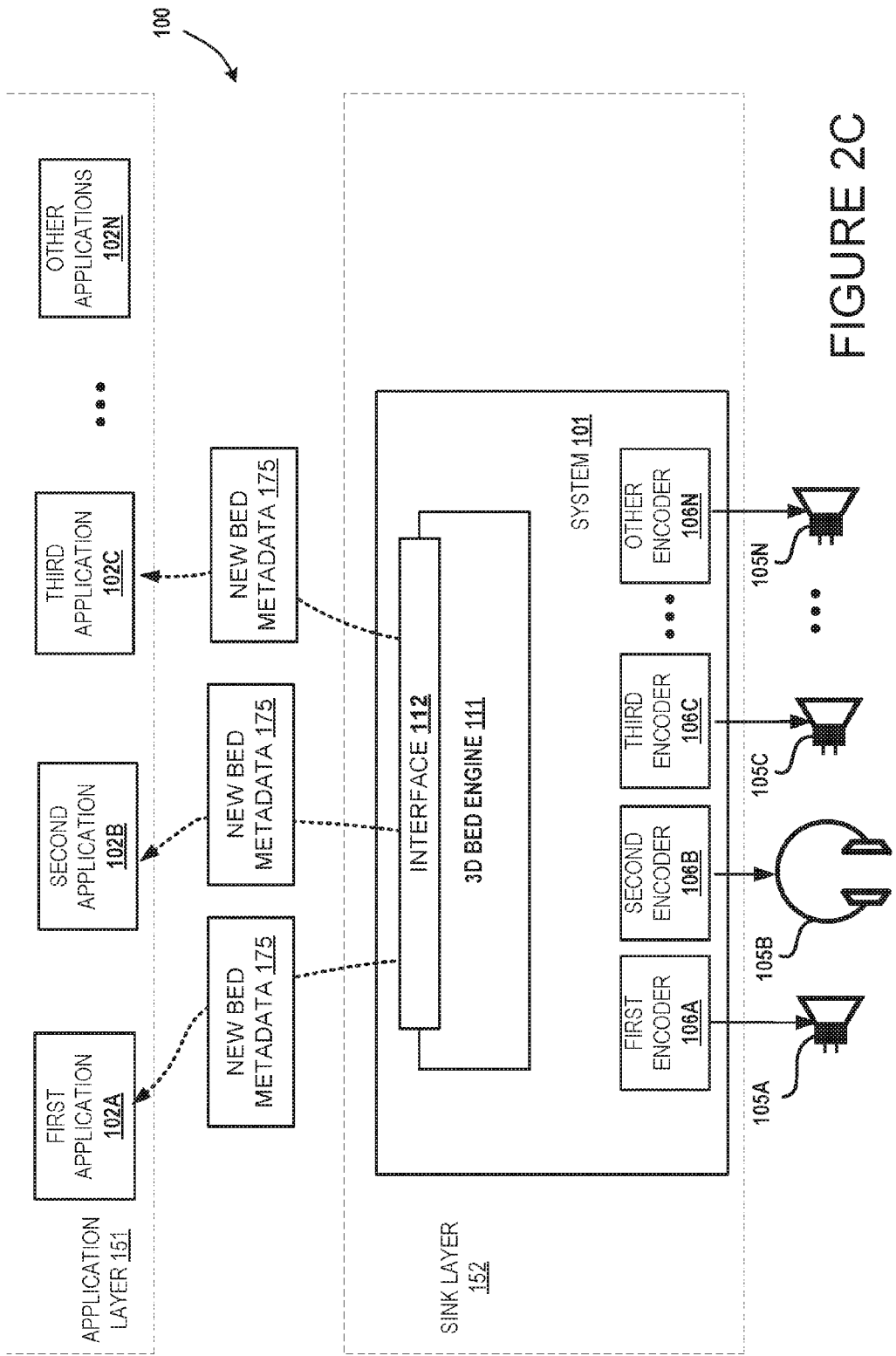

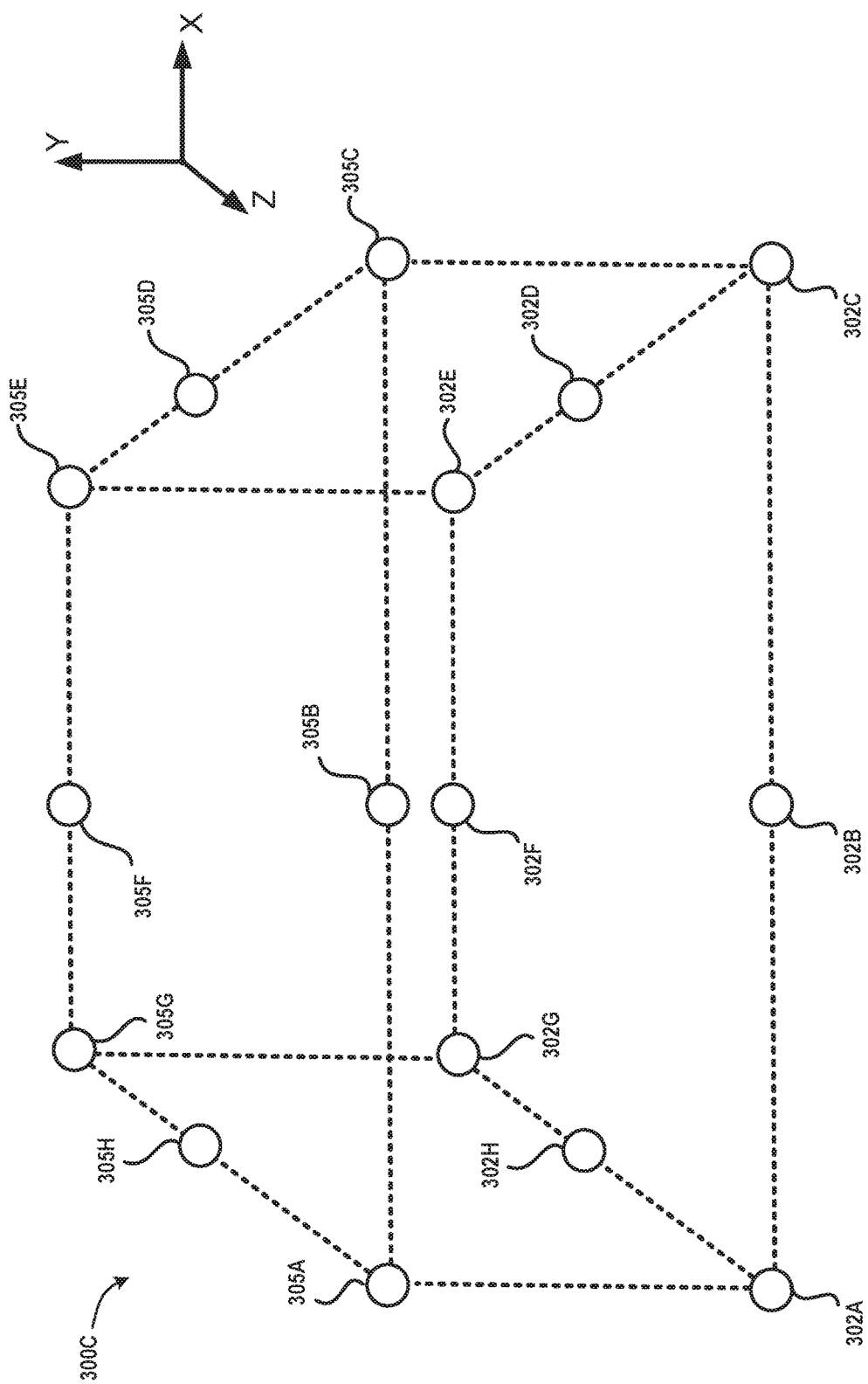

SHARED THREE-DIMENSIONAL AUDIO BED

CROSS REFERENCE TO RELATED CASES

This Application claims the benefit of U.S. Patent Application No. 62/405,665 filed on Oct. 7, 2016, entitled: SHARED THREE-DIMENSIONAL AUDIO BED, the subject matter of which is hereby incorporated by reference in its entirety.

BACKGROUND

Some traditional software applications are configured to provide a rich surround sound experience. For instance, a video game or a media player can produce an output utilizing a Dolby 5.1 surround sound system. With advancements over the years, some systems can now utilize different technologies involving a growing set of speaker arrangements. The various speaker arrangements that have been introduced over the years involve well over five speakers and some arrangements can provide unique special effects.

Despite the advancements that have occurred over the years, many existing systems are still quite limited when it comes to the diversity of their feature base. Most existing systems are focused on speaker arrangements that are limited to a single plane. For instance, although Dolby technologies have advanced from 5.1 to 7.1 and beyond, the speaker arrangements are still fixed to a single plane. Such systems are quite limited in delivering a full surround sound experience for users.

It is with respect to these and other considerations that the disclosure made herein is presented.

SUMMARY

The techniques disclosed herein enable a system to provide a shared three-dimensional ("3D") audio bed that is perpetually available for receiving and rendering custom audio data from multiple resources executing at an application layer. In some configurations, the system manages bed metadata defining a number of speaker objects of a 3D audio bed. The speaker objects of the 3D audio bed can include virtual speakers or actual speakers. The bed metadata also associates each speaker object with a location, which in some configurations, is defined by a three-dimensional coordinate system. The bed metadata can be communicated to a plurality of applications executing at an application layer. The applications can then generate custom 3D audio data that associates individual audio streams with individual speaker objects of the 3D audio bed. The applications can then communicate the custom 3D audio data to a 3D audio bed engine, which causes the processing and rendering of the custom 3D audio data to an output device utilizing a selected spatialization technology, such as Dolby Atmos, HRTF, etc.

The techniques disclosed herein provide a number of features to enhance the user experience. In one aspect, the techniques disclosed herein allow multiple applications to share a custom 3D audio bed. Each application is aware of the audio bed configurations by the use of an 3D bed engine that can dynamically communicate the bed metadata to one or more applications, and the 3D audio bed engine is configured to receive and render custom 3D audio data from each application. In one illustrative example, a 3D audio bed may include a predetermined number of speaker objects e.g., 16 speakers at fixed positions. Any application running on the system can send media streams to any of the speaker objects at any point in time and the speaker objects are always available for any application, even when other applications are sending audio data to the speaker objects.

The techniques disclosed herein also enable applications to utilize more than one 3D audio bed configuration. In one illustrative example, a computing system may select a first 3D audio bed having a first arrangement of speaker locations when the system is rendering audio data under a first spatialization technology, such as Dolby Atmos; and the system can select a second 3D audio bed having a second arrangement of speaker locations when the system is rendering audio under a second spatialization technology, such as HRTF. Thus, when the system transitions between spatialization technologies, or transitions between output devices, the system can also select individual 3D bed configurations that are optimized for the selected spatialization technology or selected output device. By allowing a system to utilize different 3D audio beds having different speaker positions, and coordinating such changes with applications, a more rich, dynamic experience, one that expands beyond speaker positions limited to a single plane, is provided.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

FIG. 1 illustrates an example system for enabling a shared 3D audio bed.

FIG. 2B illustrates a second state of an example scenario showing the communication of data for enabling a shared 3D audio bed.

FIG. 2C illustrates a third state of an example scenario showing the communication of data for enabling a shared 3D audio bed.

FIG. 3C illustrates a third representation of a shared 3D audio bed.

DETAILED DESCRIPTION

Figure 2A:
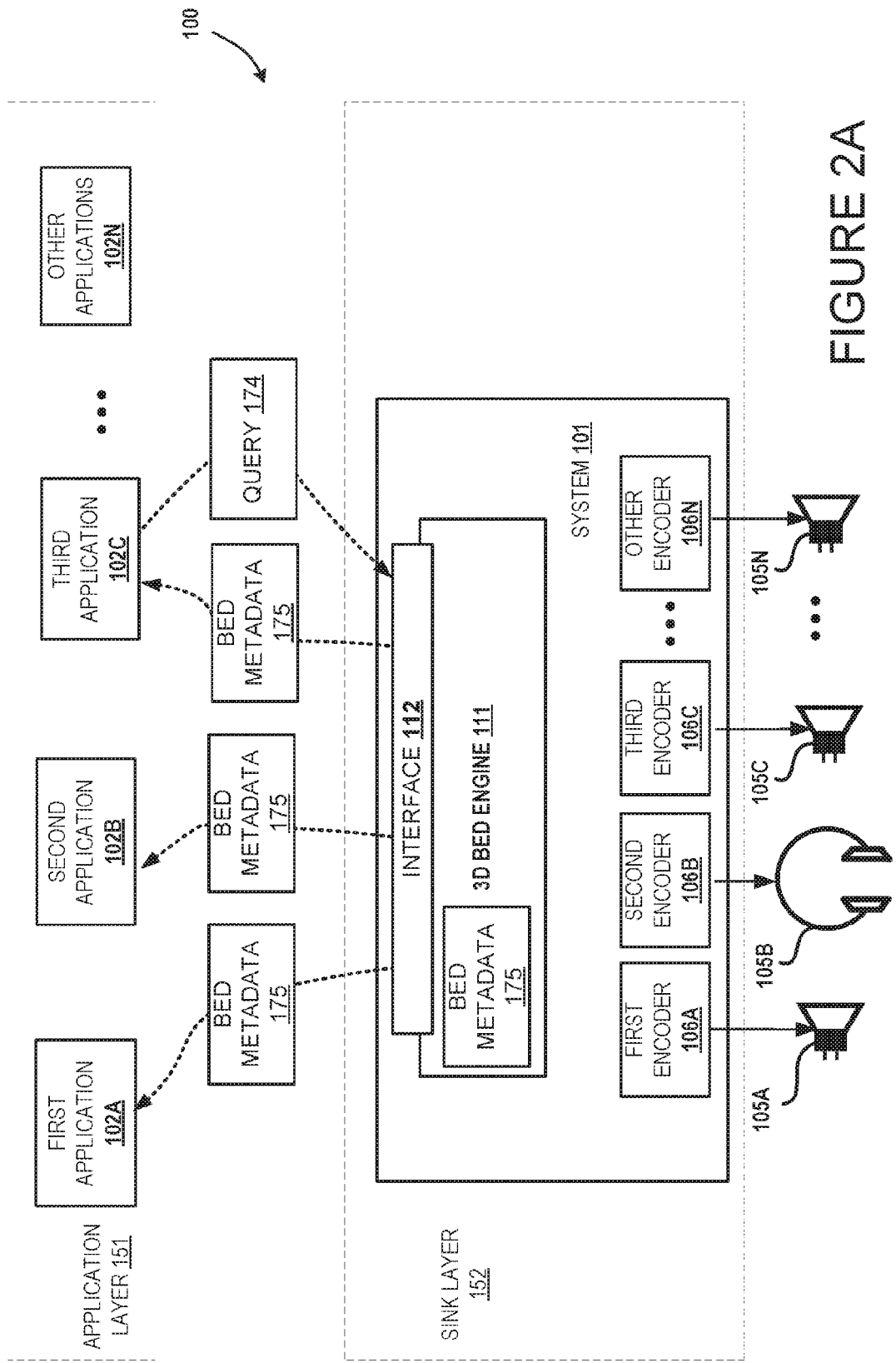
FIG. 2A illustrates a first state of an example scenario showing the communication of data for enabling a shared 3D audio bed.

The following Detailed Description discloses techniques and technologies that enable a system to provide a 3D audio bed (also referred to herein as a "3D bed") that is perpetually available for receiving and rendering custom audio data from multiple resources executing at an application layer. In some configurations, the system manages bed metadata defining a number of speaker objects of a 3D audio bed. The speaker objects of the 3D audio bed include virtual speakers or actual speakers. The bed metadata also associates each speaker object with a location, which in some configurations, is defined by a three-dimensional coordinate system. The bed metadata can be communicated to a plurality of applications executing at an application layer. The applications can then generate custom 3D audio data that associates individual audio streams with individual speaker objects of the 3D audio bed. The applications can then communicate the custom 3D audio data to a 3D audio bed engine, which causes the processing and rendering of the custom 3D audio data to an output device utilizing a selected spatialization technology, such as Dolby Atmos, HRTF, etc.

The techniques disclosed herein provide a number of features to enhance the user experience. In one aspect, the techniques disclosed herein allow multiple applications to share a custom 3D audio bed. Each application is aware of the audio bed configuration by the communication of the bed metadata to each application, and the 3D audio bed engine is configured to receive and render custom 3D audio data from each application. In one illustrative example, a 3D audio bed may include a predetermined number of speaker objects e.g., 16 speakers at fixed positions. Any application running on the system can send media streams to any of the speaker objects at any point in time and the speaker objects are always available for any application, even when other applications are sending audio data to the speaker objects.

The techniques disclosed herein also enable applications to utilize more than one 3D bed configuration. In one illustrative example, a computing system may select a first 3D audio bed having a first arrangement of speaker locations when the system is rendering audio data under a first spatialization technology, such as Dolby Atmos; and the system can select a second 3D audio bed having a second arrangement of speaker locations when the system is rendering audio under a second spatialization technology, such as HRTF. Thus, when the system transitions between spatialization technologies, or transitions between output devices, the system can also select individual 3D bed configurations that are optimized for the selected spatialization technology or selected output device. By allowing a system to utilize different three-dimensional audio beds having different speaker positions, and coordinating such changes with applications, a more rich, dynamic experience, one that expands beyond speaker positions limited to a single plane, is provided. For illustrative purposes, a spatialization technology is also referred to herein as a category of functionality for encoding one or more audio signals. In the present disclosure, for example, a first category of functionality can be HRTF, a second category of functionality can be Dolby Atmos, a third category of functionality can be a MICROSOFT-based technology, etc. Computer-implemented instructions defining the spatialization technology cause an encoder to generate a rendered output signal from the encoder to one or more endpoint devices for producing an audio output of the individual audio streams that are provided by one or more applications.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling a shared three-dimensional audio bed. As will be described in more detail below with respect to FIG. 5, there are a number of applications and modules that can embody the functionality and techniques described herein.

FIG. 1 is an illustrative example of a system 100 configured to provide a shared three-dimensional audio bed. The system 100 comprises a controller 101 executing at a sink layer 152 for storing, communicating, and processing the audio data and metadata described herein. The controller 101 comprises a 3D bed engine 111 configured to provide a 3D audio bed that is perpetually available for receiving and rendering customizable audio data from multiple resources at an application level. The 3D bed engine 111 is configured to communicate bed metadata 175 to one or more applications 102. As described in more detail below, the bed metadata 175 enables the applications 102 to generate 3D audio data that is customized in accordance to a 3D bed defined by the bed metadata 175. The 3D bed engine 111 is also configured to receive input signals, e.g., custom 3D audio data formed for a particular 3D bed, from one or more applications 102. The 3D bed engine 111 can also be configured to process and communicate the custom 3D audio data to one or more encoders 106 where the custom 3D audio data is processed according to a selected spatialization technology, e.g., Dolby Atmos, HRTF, etc., and rendered to an output device 105.

The bed metadata 175 defines the configuration of a 3D bed. In general, a 3D bed can comprise a number of speakers, which are also referred to herein as speaker objects. A 3D bed can model an arrangement of speakers, and the model can involve actual speakers and/or virtual speakers. In one example, the bed metadata 175 can define a number of speaker objects for a 3D bed and provide specific three-dimensional coordinates for each speaker object. For example, the bed metadata 175 can indicate that a front-center speaker has a specific location, e.g., (X, Y, Z) coordinates of a three-dimensional area. Other speaker objects of the 3D bed can be associated with a location in a same manner. Any suitable coordinates system, or any other suitable data format for defining a location of an object in a three-dimensional area, can be utilized with the techniques disclosed herein. In another example, the location of a particular speaker object may be based on vector data.

The bed metadata 175 can also define properties with respect to each speaker object. For example, the bed metadata 175 can indicate that a speaker object is configured to function according to a particular shape or pattern, e.g., omnidirectional, bidirectional, cardioid, parabolic, shotgun, etc. The bed metadata 175 can also indicate, among other attributes, a direction of a speaker object.

The 3D bed engine 111 can be configured with an interface 112 for communicating bed metadata 175 and other data with any number (N) of applications 102 executing at an application layer 151. As shown in FIG. 2A, the bed metadata 175 can be pushed to individual applications 102, or the bed metadata 175 can be communicated to the applications 102 in response to receiving a query 174 from an application 102. For illustrative purposes, some example applications 102 are individually referred to herein as a first application 102A, a second application 102B, and a third application 102C. Individual applications 102 can also comprise one or more preprocessors for executing code configured to perform the techniques disclosed herein.

The applications 102 can comprise any executable code configured to process object-based audio (also referred to herein as "3D bed audio" and "3D object audio") and/or channel-based audio (also referred to herein as "2D audio"). Examples of the applications 102 can include but, are not limited to, a media player, a web browser, a video game, a virtual reality application, and a communications application. The applications 102 can also include components of an operating system that generate system sounds.

In addition to providing functionality for interacting with a user, the applications 102 can apply one or more operations to object-based audio, including, but not limited to, one or more folding operations and co-location operations, which can involve combining multiple objects into a single object. In another example, the applications 102 can utilize one or more culling operations, which can involve the elimination of one or more selected audio objects.

The applications 102 can generate 3D audio data that is customized in accordance with the bed metadata 175. In one illustrative example, if the first application 102A is a video game generating raw object-based audio data having 300 audio objects, and the bed metadata 175 defines a 3D bed having 10 speakers at specific locations of a three-dimensional area, the application 102A can process the 300 audio objects, e.g. fold, co-locate, and/or filter the objects, to appropriately associate individual or combined audio streams of the raw audio data with the 10 speakers and their respective locations. The applications 102 can generate custom 3D audio data 176 containing the audio data and other definitions associating audio streams with one or more speaker objects. As shown in FIG. 2B, the custom 3D audio data 176 can be communicated to the 3D bed engine 111 from each application 102 via the interface 112.

As shown in FIG. 2C, in addition to receiving audio data from individual applications 102, components, e.g., source A 133A and source B 133B, within individual applications 102 can also individually generate audio data configured in accordance to the bed metadata. For example, if the third application 102C is a video game, and the video game has one audio source 133A for background music and another audio source 133B for sound effects, each source can generate and communicate custom 3D audio data 175 to the 3D bed engine 111.

The above-described functionality can be performed by modules of the application 102 or an application may be associated with, or can include, a preprocessor for performing said functionality. In some configurations, the system 100 can comprise a preprocessor layer between the application layer 151 and the sink layer 152 comprising one or more preprocessors that are configured to communicate with the applications and the 3D bed engine 111. Configurations comprising preprocessors that serve as an interface between the applications 102 and the 3D bed engine 111 can be utilized for offloading portions of the computational tasks from the applications 102 and the 3D bed engine 111.

The controller 101 can comprise a suitable number (N) of encoders 106. For illustrative purposes, some example encoders 106 are individually referred to herein as a first encoder 106A, a second encoder 106B, and a third encoder 106C. The encoders 106 can be associated with a suitable number (N) of output devices 105. For illustrative purposes, some example output devices 105 are individually referred to herein as a first output device 105A, a second output device 105B, a third output device 105C. This example system 100 is provided for illustrative purposes and is not to be construed as limiting. It can be appreciated that the system 100 can include fewer or more components than those shown in FIG. 1.

The encoders 106 are configured to process channel-based audio and object-based audio according to one or more selected spatialization technologies. A rendered stream generated by an encoder 106 can be communicated to one or more output devices 105. Examples of an output device 105, also referred to herein as an "endpoint device," include, but are not limited to, speaker systems and headphones. An encoder 106 and/or an output device 105 can be configured to utilize one or more spatialization technologies such as Dolby Atmos, HRTF, etc.

The encoders 106 can also implement other functionality, such as one or more echo cancellation technologies. Such technologies are beneficial to select and utilize outside of the application environment, as individual applications do not have any context of other applications, thus can't determine when echo cancellation and other like technologies should be utilized.

As summarized above, the techniques disclosed herein also enable applications 102 to utilize more than one 3D bed configuration. In one illustrative example, the system 100 may select a first 3D audio bed having a first arrangement of speaker locations when the system is rendering audio under a first spatialization technology, such as Dolby Atmos; and the system 100 can select a second 3D audio bed having a second arrangement of speaker locations when the system is rendering audio under a second spatialization technology, such as HRTF. Thus, when the system transitions between spatialization technologies, or transitions between different output devices, the system 100 can also select individual 3D bed configurations that are optimized for the selected spatialization technology and/or output device.

Figure 2D:
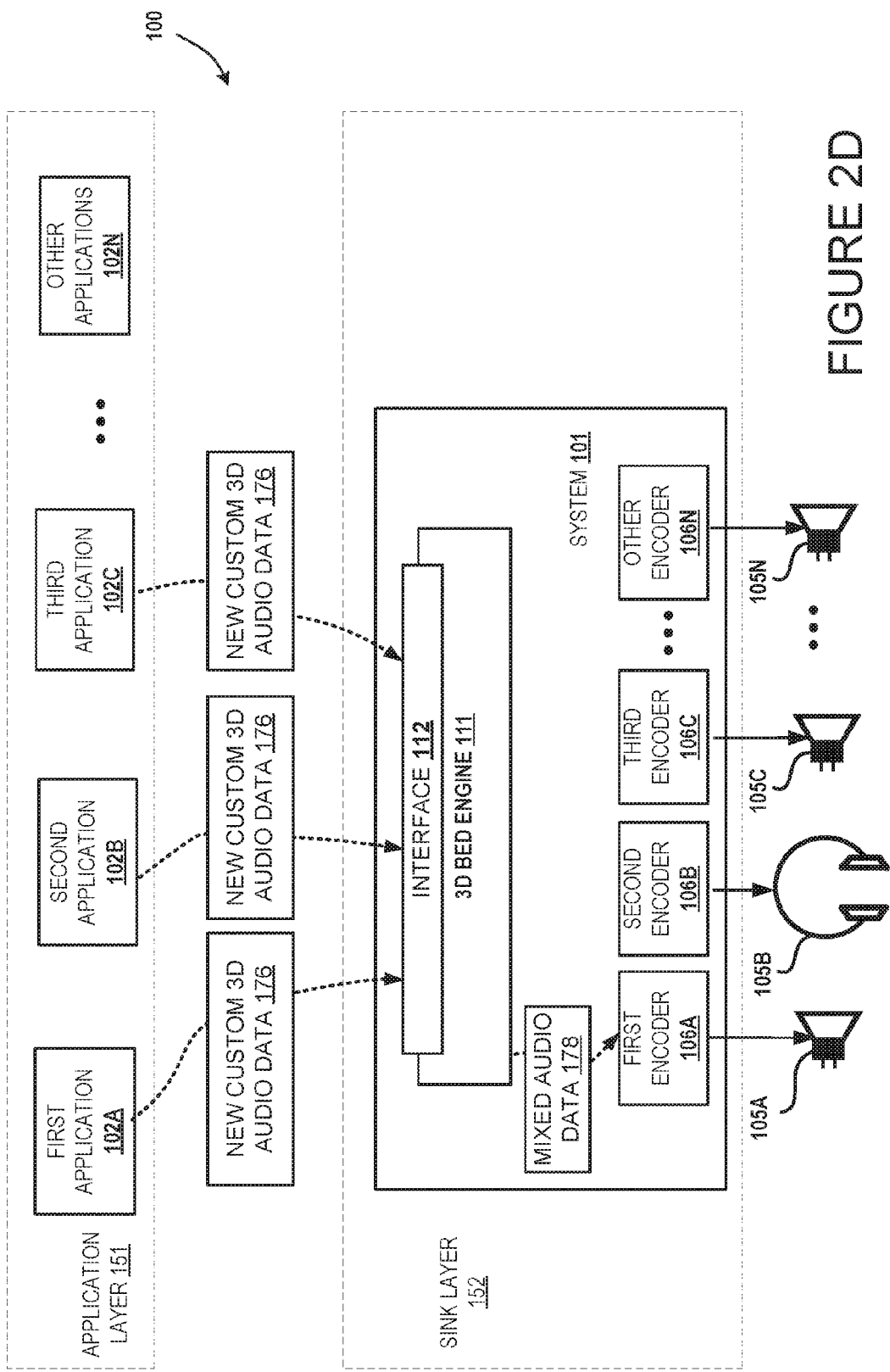
FIG. 2D illustrates a fourth state of an example scenario showing the communication of data for enabling a shared 3D audio bed.

In some configurations, the system 100 can transition between a first spatialization technology and a second spatialization technology based on one or more actions. For instance, if a user if the system 100 is rendering audio under HRTF, and a user plugs in a Dolby Atmos speaker system or a Dolby Atmos headset, the system can transition from the HRTF spatialization technology to the Dolby Atmos spatialization technology. When the system 100 detects a transition between different spatialization technologies, the system can select a 3D audio bed configuration that is most appropriate for a selected spatialization technology. To facilitate such configurations, the system 100 can associate different 3D audio bed configurations with individual spatialization technologies and/or specific endpoint devices, such as a specialized headset or speaker system. When such a transition occurs, as shown in FIG. 2C, the 3D bed engine 111 can communicate new bed metadata 175 from the 3D bed engine 111 to one or more applications 102. The receipt of the new bed metadata 175 causes each application to generate new custom 3D audio data that associates individual audio streams with the speaker positions defined in the new bed metadata 175. As shown in FIG. 2D, each application 102 can then communicate the new custom 3D audio data to the 3D bed engine 111 via the interface 112.

Figure 3A:
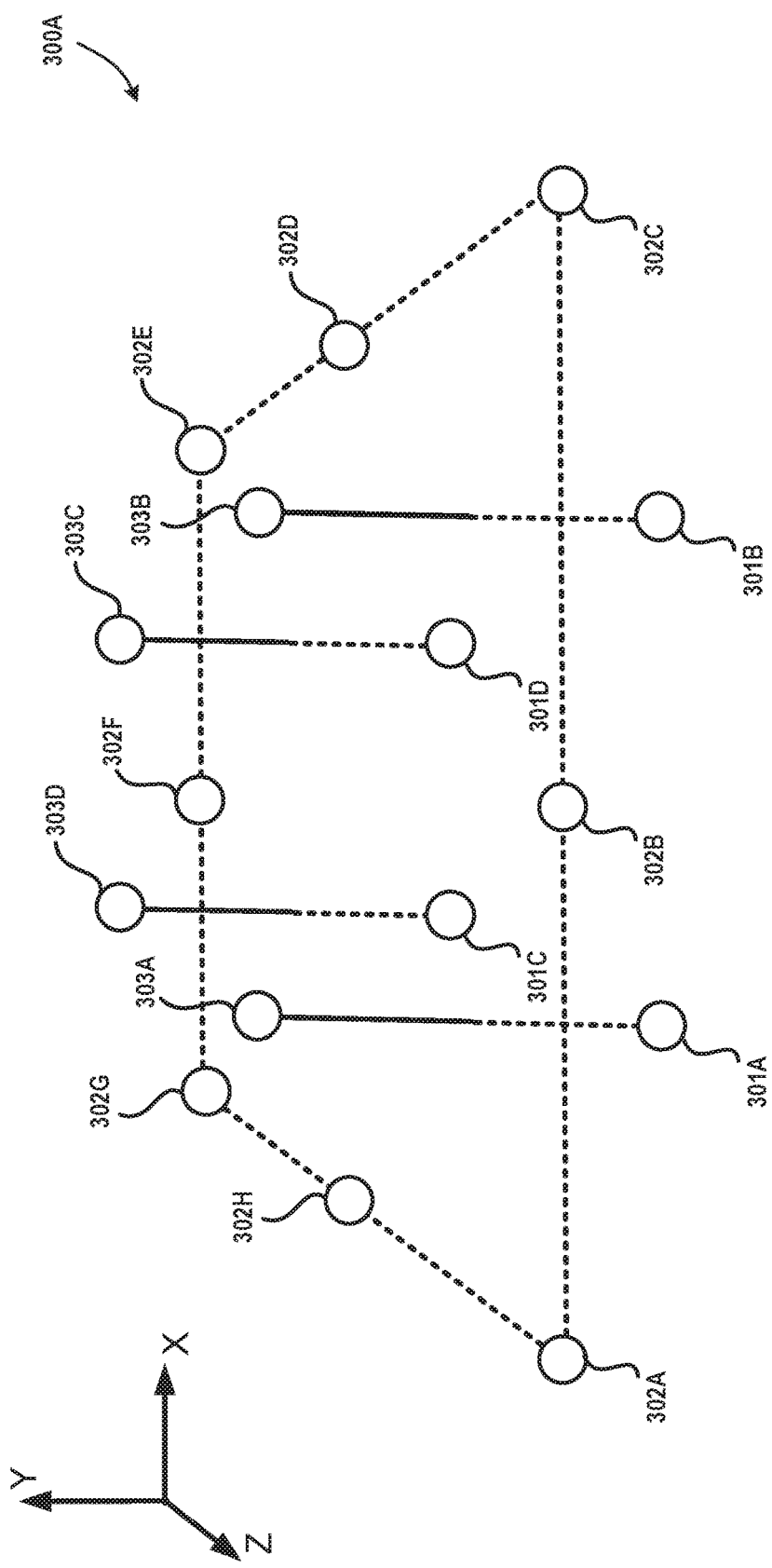
FIG. 3A illustrates a first representation of a shared 3D audio bed.
Figure 3B:
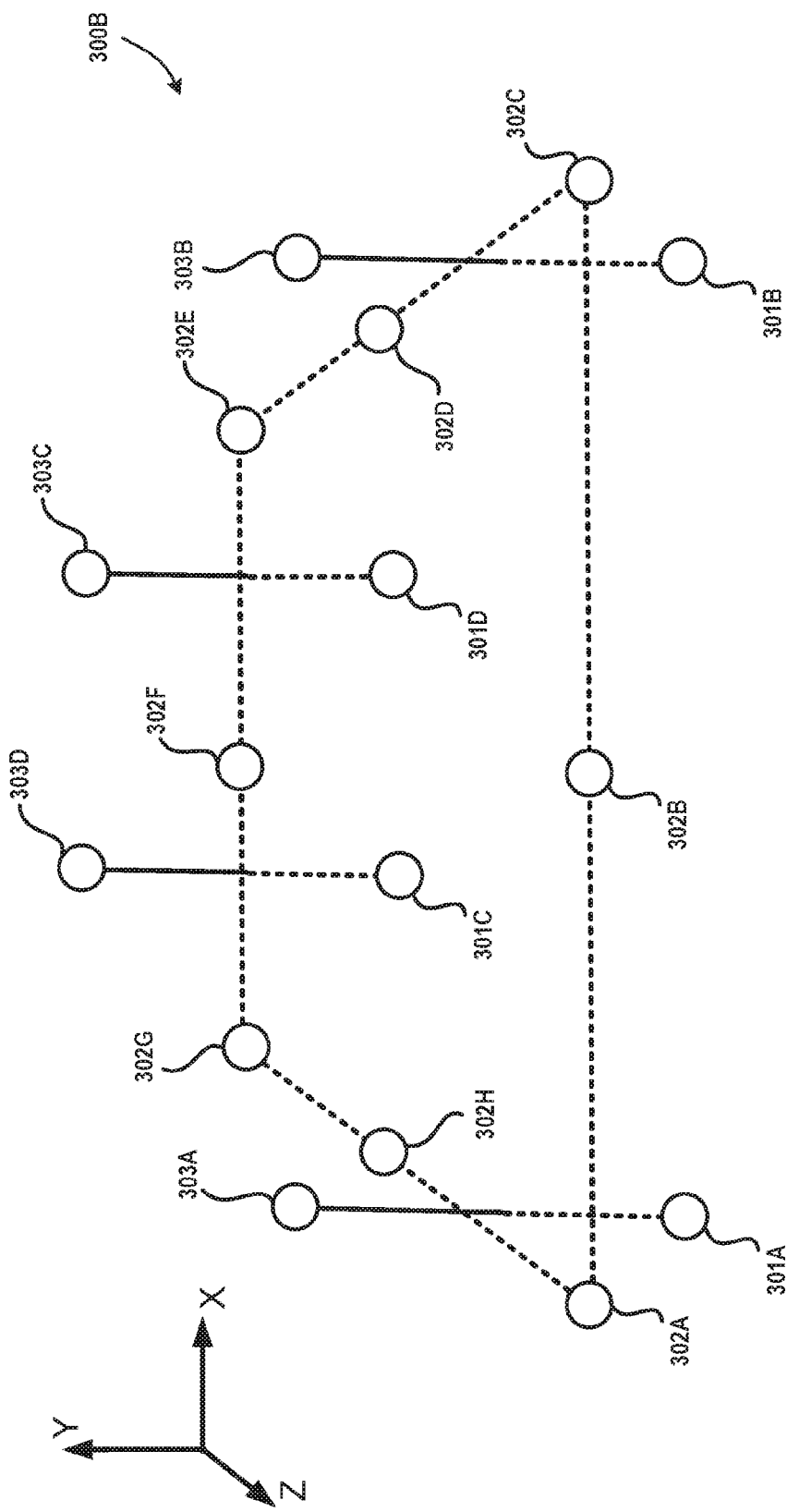
FIG. 3B illustrates a second representation of a shared 3D audio bed.

Referring now to FIG. 3A-3C, illustrations showing various configurations for example 3D audio beds are shown and described below. FIG. 3A illustrates a first 3D audio bed 300A having a plurality of speaker objects 301-303. Each speaker object is associated with a particular location within a three-dimensional area. For example, a particular speaker object can have a location designated by an X, Y and Z value. In this example, the first 3D audio bed 300A comprises a number of speaker objects 302A-302H positioned around a perimeter of a plane. In this example, the first speaker object 302A is a front-right speaker object, the second speaker object 302B is the front-center speaker, and the third speaker object 302C is the front-left speaker. The other speaker objects 302D-302H include surrounding speaker locations within the plane. The first 3D audio bed 300A also comprises a number speakers 301A-301D positioned below plane, and a number of speakers 303A-303D positioned above the plane.

The 3D bed engine 111 is configured to receive audio streams "signals" associated with individual speaker positions. The 3D bed engine 111 can receive audio streams for individual speaker objects from multiple applications 102 at once. For instance, with reference to FIG. 3A, the 3D bed engine 111 can receive audio signals from multiple applications 102 for each of the speaker objects 301-303. This feature enables each application to utilize all aspects of the 3D audio bed 300A without isolating certain applications 102 from using such resources.

The bed metadata 175 can be used to define attributes associated with each speaker object 301-303 including a location for each speaker object, a shape for each speaker object, a direction for each speaker object, etc. The bed metadata 175 can be communicated to one or more applications 102 for enabling the applications 102 to associate audio streams with each speaker object. For example, an application and/or a preprocessor can associate one or more object-based audio tracks with one or more speaker objects of the first 3D audio bed 300A. The associations can be made using a number of different technologies.

As summarized above, the system 100 can utilize different 3D audio bed configurations for different scenarios. For instance, the 3D bed engine 111 can utilize the first 3D audio bed 300A (FIG. 3A) with a particular spatialization technology. When the system 100 utilizes another spatialization technology, the system 100 can transition to another 3D audio bed configuration, such as the second 3D audio bed 300B (FIG. 3B). This type of transition enables the system 100 to utilize a 3D audio bed configuration that is most optimal for a particular spatialization technology. The same transition can occur when the system transitions to a new output device. For example, when the system 100 transitions from a speaker system to headphones, the 3D bed engine 111 can transition from a first 3D bed configuration to a second 3D bed configuration. The examples disclosed herein are provided for illustrative purposes and are not to be construed as limiting. It can be appreciated that a transition between different 3D audio bed configurations can include a transition to 3D audio bed configuration having a different number of speakers with a completely different layout. For instance, the system 100 may transition from the first 3D audio bed 300A shown in FIG. 3A to the third 3D audio bed 300C shown in FIG. 3C.

In the illustrative examples described above, some of the speaker objects of the second configuration (FIG. 3B) are in different locations compared to the speaker objects of the first configuration (FIG. 3A). In addition to providing different locations, each configuration can also associate different properties for each speaker object, e.g., a different shape properties, different directions, etc. As shown in FIG. 3C, other 3D audio bed configurations, such as the third 3D audio bed 300C, can comprise a different number of speaker objects. Thus, when a system transitions to different spatialization technologies or transitions to different output devices, the system can transition to new 3D audio bed having any suitable number of speaker objects and any suitable number of associated properties.

Figure 4:
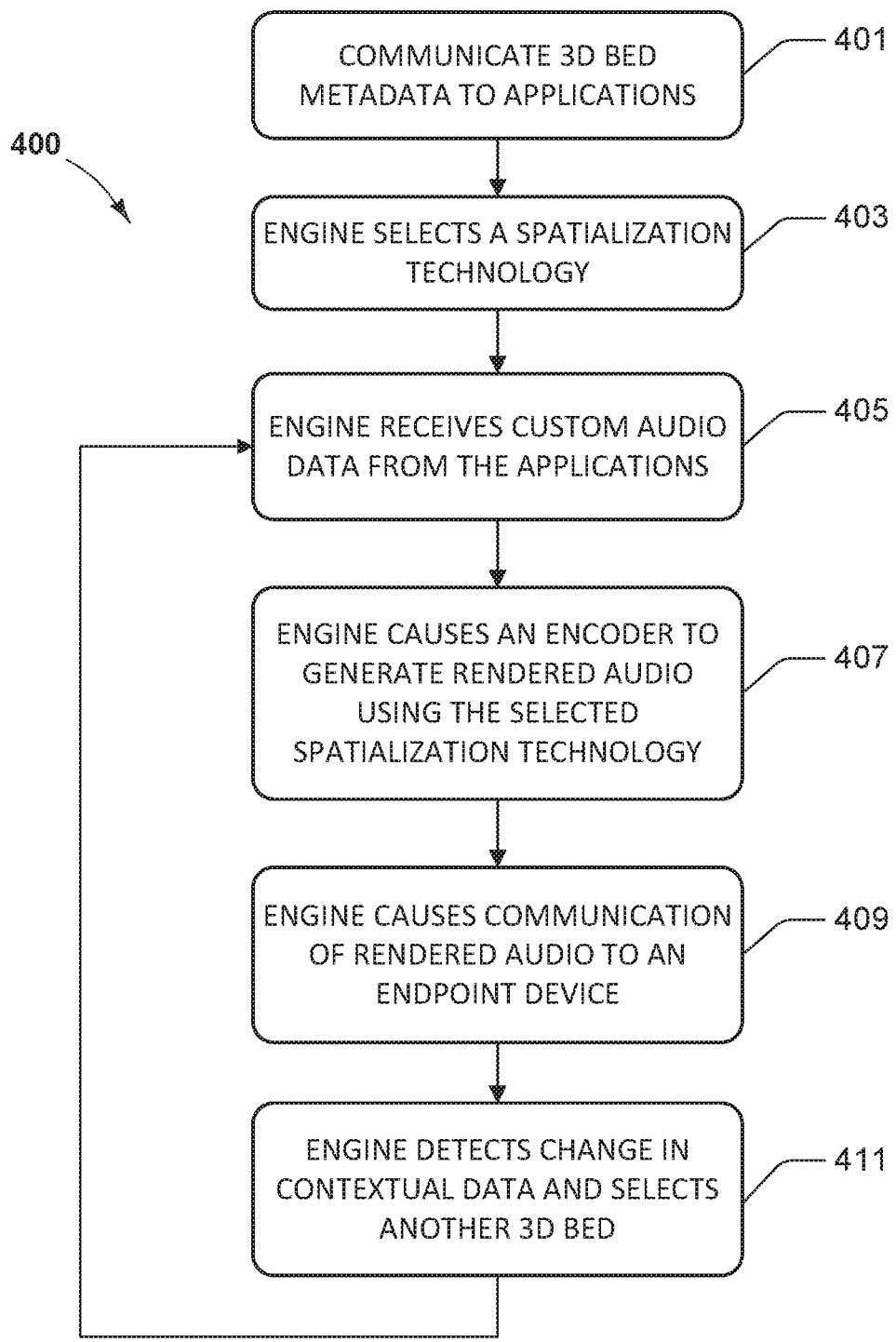
FIG. 4 illustrates a flow diagram of a routine for enabling a shared 3D audio bed.

Turning now to FIG. 4, aspects of a routine 400 for enabling a shared three-dimensional audio bed are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an application, component and/or circuit, such as the 3D bed engine 111. In some configurations, the resource manager 190 can be a dynamically linked library (DLL), a statically linked library, functionality produced by an application programming interface (API), a compiled program, an interpreted program, a script or any other executable set of instructions. Data and/or modules, 3D bed engine 111, can be stored in a data structure in one or more memory components. Data can be retrieved from the data structure by addressing links or references to the data structure.

Figure 5:
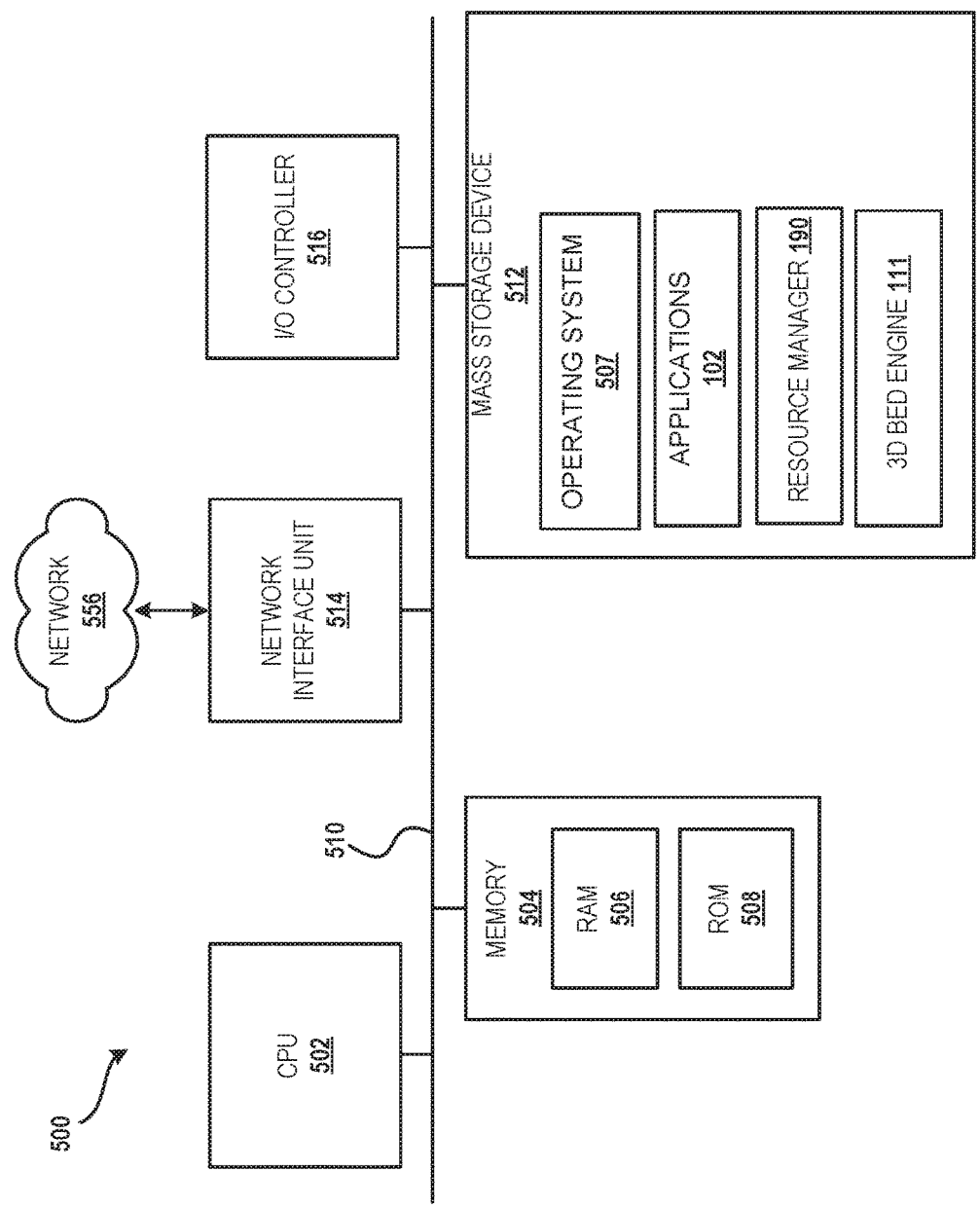
FIG. 5 is a computer architecture diagram illustrating an illustrative computer hardware and software architecture for a computing system capable of implementing aspects of the techniques and technologies presented herein.

Although the following illustration refers to the components of FIG. 1 and FIG. 5, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. Any service, circuit or application suitable for providing the techniques disclosed herein can be used in operations described herein.

With reference to FIG. 4, the routine 400 begins at operation 401, where the 3D bed engine 111 communicates 3D bed metadata 175 to a plurality of applications 102. As summarized above, the 3D bed metadata 175 defines a location for individual speaker objects of a plurality of speaker objects in a three-dimensional audio bed. The bed metadata 175 can also define properties with respect to each speaker object. For example, the bed metadata 175 can indicate that a speaker object is configured to function according to a particular shape or pattern, e.g., omnidirectional, bidirectional, cardioid, parabolic, shotgun, etc. The bed metadata 175 can also indicate, among other properties (also referred to as "attributes"), a direction of a speaker object.

At operation 403, the 3D bed engine 111 selects a spatialization technology. In some configurations, a spatialization technology can be selected based on the capabilities of an encoder or an output device. For instance, if an encoder is configured to accommodate the Dolby Atmos spatialization technology, the resource manager can select the Dolby Atmos spatialization technology. In some configurations, the spatialization technology can be selected based on one or more preferences. For instance, a user can indicate a preference for utilizing headphones over a speaker system when the headphones are available. If the headphones are configured to accommodate a particular spatialization technology, such as HRTF, and the headphones are plugged into the system 100, that particular spatialization technology can be selected. These examples are provided for illustrative purposes and are not to be construed as limiting.

Next, at operation 405, the 3D bed engine 111 receives custom 3D audio data 176 that conforms to the bed metadata 175. In some configurations, when the applications 102 receive the 3D bed metadata 175, they process raw forms of object-based audio data having a number of audio streams (such as object-based audio of a media file or a video game) into custom 3D audio data 176 that associates the audio streams with speaker objects defined in the 3D bed metadata 175. The applications can process the raw forms of object-based audio data using a number of different techniques, e.g., folding and co-locating audio objects, to generate custom 3D audio data 176 that associates individual audio streams to the speaker objects defined in the 3D bed metadata 175. In one illustrative example, the first application 102A, the second application 102B, and the first source 133A and the second source 133B of the third application 102C can each associate audio streams with individual speaker objects of the first 3D audio bed 300A shown in FIG. 3A. Custom 3D audio data 176 defining the associations can be communicated with the audio streams from the applications 102 to the 3D bed engine 111.

In operation 405, the 3D bed engine 111 mixes the audio streams received from the applications 102 for individual speaker objects. For example, the first application 102A, the second application 102B, and the first source 133A and the second source 133B of the third application 102C can each send audio streams for individual speaker objects of a 3D audio bed, and the 3D bed engine 111 mixes the audio streams for each speaker object to generate mixed audio data 178. Mixing the audio streams for each speaker object prior to sending the audio data to an encoder 106 for rendering helps shift some of the processing resources away from the encoders 106.

At operation 407, the 3D bed engine 111 causes an encoder 106 to generate rendered audio from the mixed audio data 178 using the selected spatialization technology. Any suitable spatialization technology can be utilized in operation 407. In addition, operation 407 can also include a process for downloading software configured to implement the selected spatialization technology. In some configurations, one or more encoders 106 can utilize the selected spatialization technology to generate a spatially encoded stream, e.g., rendered audio.

Next, at operation 409, the 3D bed engine 111 causes the communication of the rendered audio to an endpoint device. For example, the rendered audio can be communicated to a speaker system or headphones. In operation 409, the 3D bed engine 111 can also combine 2D audio with the rendered audio. The communication of the rendered output signal from the encoder to one or more endpoint devices produces producing an audio output of the individual audio streams. The endpoint devices produce an audio output (an audible waveform) of the individual audio streams, wherein the audio output, e.g., the actual sound content, of the individual audio streams emanate from the locations of the individual speaker objects associated with the individual audio streams. In configurations where an endpoint device includes a physical speaker as an output for a speaker object, the audio output of the audio streams associated with that speaker object emanates from the physical speaker. In configurations where a speaker object is associated with a virtual speaker having an associated location, the audio output of the audio streams associated with that speaker object sounds as if it is emanating from the location of the virtual speaker. For illustrative purposes, an audio output of the individual audio streams emanating from the locations of the individual speaker objects means an audio output emanating from a physical speaker or an audio output that is configured to simulate an output emanating from a virtual speaker.

Next, at operation 411, the 3D bed engine 111 can receive contextual data indicating a change in the system 100. For example, the contextual data can comprise one or more changed preferences, data indicating updated capabilities of the spatialization technology, data indicating updated capabilities of an encoder, or data indicating updated capabilities of one or more endpoint devices. Operation 411 may occur, for example, when a user plugs in new headphones that is configured to accommodate a particular spatialization technology or when a user or the system 100 provides a command to change the spatialization technology. In such an example, the 3D bed engine 111 can select a new 3D bed and thus select new bed metadata 175 defining aspects of the new 3D bed. In other examples, an update to a computer may include one or more updated components of a spatialization technology, e.g., a category of functionality. A category of functionality may be associated with one or more features such as a limit of a number of objects, a manner in which audio data is processed, etc. An update to an spatialization technology can include an update to one or more parameters, such as a number of objects a spatialization technology can concurrently process, or a change in a method in which the individual audio streams are encoded into an audio output When a new 3D bed is selected in operation 411, the routine 400 returns to operation 405 where an encoder generates rendered audio using the new 3D bed. In turn, the routine 400 continues to other operations where the rendered audio that is generated for the new 3D bed is communicated to one or more endpoint devices. It can be appreciated that the routine 400 can continue through operations 405 and 411 to dynamically change the selected 3D bed as preferences and/or capabilities of the system 100 change.

FIG. 5 shows additional details of an example computer architecture 500 for a computer, such as the computing device 101 (FIG. 1), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, one or more applications 102, the resource manager 190, the 3D bed engine 111, and other data and/or modules.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
   a processor;
   a computer-readable storage medium in communication with the processor, the computer-readable storage medium having computer-executable instructions stored thereupon which, when executed by the processor, cause the processor to:
      communicate three-dimensional bed metadata to a plurality of applications, the three-dimensional bed metadata defining locations of the individual speaker objects of a plurality of speaker objects in a three-dimensional audio bed;
      receive custom three-dimensional audio data from individual applications of the plurality of applications causing the plurality of applications to concurrently share the speaker objects in the three-dimensional audio bed, wherein the custom three-dimensional audio data associates individual audio streams with the individual speaker objects;
      select a spatialization technology for rendering the custom three-dimensional audio data;
      cause an encoder to generate a rendered output signal of the custom three-dimensional audio data, wherein the rendered output is generated according to the spatialization technology; and
      cause a communication of the rendered output signal from the encoder to one or more endpoint devices for producing an audio output of the individual audio streams, wherein the audio output of the individual audio streams emanates from the locations of the individual speaker objects associated with the individual audio streams.

2. The computing device of claim 1, wherein the computer-executable instructions further cause the processor to:
   receive contextual data indicating a selection of a new spatialization technology;
   transmit new three-dimensional bed metadata to the plurality of applications, in response to receiving the data indicating a selection of the new spatialization technology, wherein the new three-dimensional bed metadata defines one or more locations for individual speaker objects of a plurality of speaker objects in a second three-dimensional audio bed;
   receive new custom three-dimensional audio data from the individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
   cause the encoder to generate a second rendered output signal of the new custom three-dimensional audio data, wherein the second rendered output is generated according to the new spatialization technology; and
   cause a communication of the second rendered output signal from the encoder to the one or more endpoint devices for producing the audio output of the individual audio streams, wherein the individual audio streams emanate from the locations of the individual speaker objects of the second three-dimensional audio bed.

3. The computing device of claim 1, wherein the computer-executable instructions further cause the processor to:
   receive contextual data indicating a selection of a new endpoint device;
   transmit new three-dimensional bed metadata to the plurality of applications, in response to receiving the data indicating a selection of the new endpoint device, wherein the new three-dimensional bed metadata defines one or more locations for individual speaker objects of a plurality of speaker objects in a second three-dimensional audio bed;
   receive new custom three-dimensional audio data from the individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
   cause the encoder to generate a second rendered output signal of the new custom three-dimensional audio data, wherein the second rendered output is generated according to the spatialization technology; and
   cause a communication of the second rendered output signal from the encoder to the new endpoint device for producing the audio output of the individual audio streams, wherein the individual audio streams emanate from the locations of the individual speaker objects of the second three-dimensional audio bed.

4. The computing device of claim 1, wherein the bed metadata further defines a shape associated with the individual speaker objects of the plurality of speaker objects, wherein the rendered output signal is modified based, at least in part, on the shape.

5. The computing device of claim 1, wherein the bed metadata further defines a direction associated with the individual speaker objects of the plurality of speaker objects, wherein the rendered output signal is modified based, at least in part, on the direction.

6. The computing device of claim 1, wherein the computer-executable instructions further cause the processor to:
receive contextual data indicating a user preference associated with at least one of the encoders or the one or more end point devices;
transmit new three-dimensional bed metadata to the plurality of applications, in response to receiving the contextual data, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the new spatialization technology; and
cause a communication of the second rendered output signal from the encoder to the one or more endpoint devices for producing the audio output of the individual audio streams, wherein the individual audio streams emanate from the locations of the individual speaker objects of the second three-dimensional audio bed.

7. The computing device of claim 1, wherein the computer-executable instructions further cause the processor to:
receive contextual data indicating an update to the spatialization technology, the update comprising a number of audio objects that can be processed or a change in a method in which the individual audio streams are encoded into an audio output;
transmit new three-dimensional bed metadata to the plurality of applications, in response to receiving the contextual data, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the new spatialization technology; and
cause a communication of the second rendered output signal from the encoder to the one or more endpoint devices for producing the audio output of the individual audio streams wherein the individual audio streams emanate from the locations of the individual speaker objects of the second three-dimensional audio bed.

8. A non-transitory computer-readable storage medium having computer-executable instructions stored thereupon which, when executed by one or more processors of a computing device, cause the one or more processors of the computing device to:
communicate three-dimensional bed metadata to a plurality of applications, the three-dimensional bed metadata defining locations of the individual speaker objects of a plurality of speaker objects in a three-dimensional audio bed;
receive custom three-dimensional audio data from individual applications of the plurality of applications causing the plurality of applications to concurrently share the speaker objects in the three-dimensional audio bed, wherein the custom three-dimensional audio data associates individual audio streams with the individual speaker objects;
select a spatialization technology for rendering the custom three-dimensional audio data;
cause an encoder to generate a rendered output signal of the custom three-dimensional audio data, wherein the rendered output is generated according to the spatialization technology; and
cause a communication of the rendered output signal from the encoder to one or more endpoint devices for producing an audio output of the individual audio streams, wherein the audio output of the individual audio streams emanates from the locations of the individual speaker objects associated with the individual audio streams.

9. The non-transitory computer-readable storage medium of claim 8, wherein the instructions further cause the one or more processors to:
receive contextual data indicating a selection of a new spatialization technology;
transmit new three-dimensional bed metadata to the plurality of applications, in response to receiving the data indicating a selection of the new spatialization technology, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the new spatialization technology; and
cause a communication of the second rendered output signal from the encoder to the one or more endpoint devices for producing the audio output of the individual audio streams, wherein the individual audio streams emanate from the locations of the individual speaker objects of the second three-dimensional audio bed.

10. The non-transitory computer-readable storage medium of claim 8, wherein the instructions further cause the one or more processors to:
receive contextual data indicating a selection of a new endpoint device;
transmit new three-dimensional bed metadata to the plurality of applications, in response to receiving the data indicating a selection of the new endpoint device, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the spatialization technology; and
cause a communication of the second rendered output signal from the encoder to the new endpoint device for producing the audio output of the individual audio streams, wherein the individual audio streams emanate from the locations of the individual speaker objects of the second three-dimensional audio bed.

11. The non-transitory computer-readable storage medium of claim 8, wherein the bed metadata further defines a shape associated with individual speaker objects of the plurality of speaker objects, wherein the rendered output signal is modified based, at least in part, on the shape.

12. The non-transitory computer-readable storage medium of claim 8, wherein the bed metadata further defines a direction associated with individual speaker objects of the plurality of speaker objects, wherein the rendered output signal is modified based, at least in part, on the direction.

13. The non-transitory computer-readable storage medium of claim 8, wherein the instructions further cause the one or more processors to:
receive contextual data indicating a user preference associated with at least one of the encoders or the one or more end point devices;
transmit new three-dimensional bed metadata to the plurality of applications, in response to receiving the contextual data, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the new spatialization technology; and
cause a communication of the second rendered output signal from the encoder to the one or more endpoint devices for producing the audio output of the individual audio streams, wherein the individual audio streams emanate from the locations of the individual speaker objects of the second three-dimensional audio bed.

14. The non-transitory computer-readable storage medium of claim 8, wherein the instructions further cause the one or more processors to:
receive contextual data indicating an update to the spatialization technology, the update comprising a number of audio objects that can be processed or a change in a method in which the individual audio streams are encoded into an audio output;
transmit new three-dimensional bed metadata to the plurality of applications, in response to receiving the contextual data, wherein the new three-dimensional bed metadata defines one or more locations for individual speaker objects of a plurality of speaker objects in a second three-dimensional audio bed;
receive new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
cause the encoder to generate a second rendered output signal of the new custom three-dimensional audio data, wherein the second rendered output is generated according to the new spatialization technology; and
cause a communication of the second rendered output signal from the encoder to the one or more endpoint devices for producing the audio output of the individual audio streams wherein the individual audio streams emanate from the locations of the individual speaker objects of the second three-dimensional audio bed.

15. A method, comprising:
communicating three-dimensional bed metadata to a plurality of applications, the three-dimensional bed metadata defining locations of the individual speaker objects of a plurality of speaker objects in a three-dimensional audio bed;
receiving custom three-dimensional audio data from individual applications of the plurality of applications causing the plurality of applications to concurrently share the speaker objects in the three-dimensional audio bed, wherein the custom three-dimensional audio data associates individual audio streams with the individual speaker objects;
selecting a spatialization technology for rendering the custom three-dimensional audio data;
sending the individual audio streams to an encoder to cause the encoder to generate a rendered output signal of the custom three-dimensional audio data, wherein the rendered output is generated according to the spatialization technology; and
cause a communication of the rendered output signal from the encoder to one or more endpoint devices for producing an audio output of the individual audio streams, wherein the audio output of the individual audio streams emanates from the locations of the individual speaker objects associated with the individual audio streams.

16. The method of claim 15, further comprising:
receiving contextual data indicating a selection of a new spatialization technology;
transmitting new three-dimensional bed metadata to the plurality of applications, in response to receiving the data indicating a selection of the new spatialization technology, wherein the new three-dimensional bed metadata defines one or more locations for individual speaker objects of a plurality of speaker objects in a second three-dimensional audio bed;
receiving new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
causing the encoder to generate a second rendered output signal of the new custom three-dimensional audio data, wherein the second rendered output is generated according to the new spatialization technology; and
causing a communication of the second rendered output signal from the encoder to the one or more endpoint devices for producing the audio output of the individual audio streams, wherein the individual audio streams emanate from the locations of the individual speaker objects of the second three-dimensional audio bed.

17. The method of claim 15, further comprising:
receiving contextual data indicating a selection of a new endpoint device;
transmitting new three-dimensional bed metadata to the plurality of applications, in response to receiving the data indicating a selection of the new endpoint device, wherein the new three-dimensional bed metadata defines one or more locations for individual speaker objects of a plurality of speaker objects in a second three-dimensional audio bed;
receiving new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
causing the encoder to generate a second rendered output signal of the new custom three-dimensional audio data, wherein the second rendered output is generated according to the spatialization technology; and
causing a communication of the second rendered output signal from the encoder to the new endpoint device for producing the audio output of the individual audio streams, wherein the individual audio streams emanate from the locations of the individual speaker objects of the second three-dimensional audio bed.

18. The method of claim 15, wherein the bed metadata further defines a shape associated with individual speaker objects of the plurality of speaker objects, wherein the rendered output signal is modified based, at least in part, on the shape.

19. The method of claim 15, wherein the bed metadata further defines a direction associated with individual speaker objects of the plurality of speaker objects, wherein the rendered output signal is modified based, at least in part, on the direction.

20. The method of claim 15, further comprising:
receiving contextual data indicating a user preference associated with at least one of the encoders or the one or more end point devices;
transmitting new three-dimensional bed metadata to the plurality of applications, in response to receiving the contextual data, wherein the new three-dimensional bed metadata defines one or more locations for individual speaker objects of a plurality of speaker objects in a second three-dimensional audio bed;
receiving new custom three-dimensional audio data from individual applications of the plurality of applications causing the plurality of applications to concurrently share the speaker objects in the three-dimensional audio bed, wherein the new custom three-dimensional audio data associates the individual audio streams with the individual speaker objects of the second three-dimensional audio bed;
causing the encoder to generate a second rendered output signal of the new custom three-dimensional audio data, wherein the second rendered output is generated according to the new spatialization technology; and
causing a communication of the second rendered output signal from the encoder to the one or more endpoint devices for producing the audio output of the individual audio streams, wherein the individual audio streams emanate from the locations of the individual speaker objects of the second three-dimensional audio bed.

* * * * *